United States Patent Office 2,755,540
Patented July 24, 1956

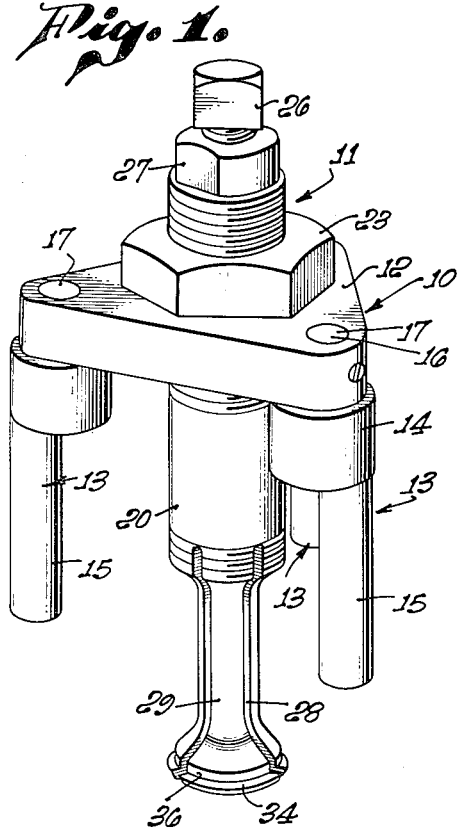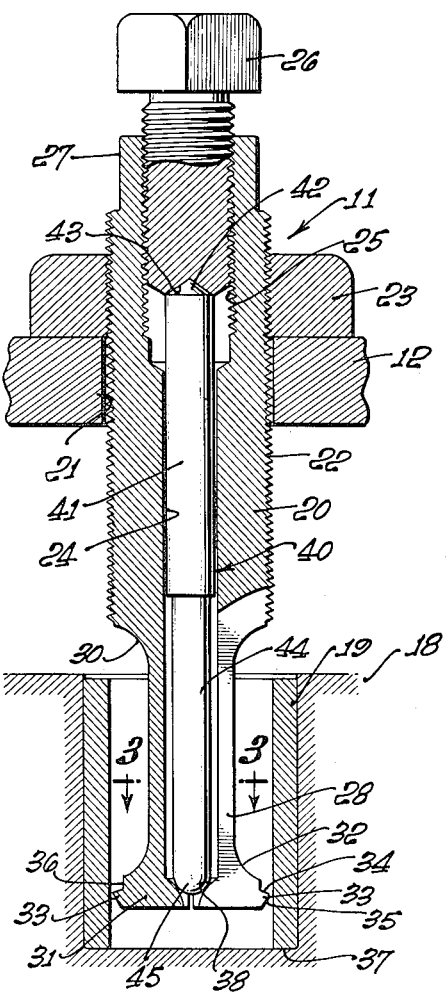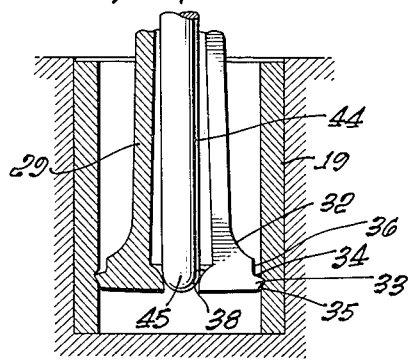

2,755,540

BUSHING AND BEARING EXTRACTOR TOOL

Harold E. Crozier, Hawthorne, Calif.

Application November 24, 1952, Serial No. 322,196

2 Claims. (Cl. 29—265)

This invention has to do with improvements in tools for the removal of bearings, bushings and the like from machines in general, either by pulling engagement with a shoulder or end face of the bushing or bearing or with its internal cylindrical surface. Merely as illustrative and for convenience, the invention may be described as adapted to the pulling and removal of cylindrical sleeve bearings.

The present type of tool may be described generally as comprising the combination of a platen or support engageable against the work at adjustably variable points depending upon the configurations of the work and best accessibility to the bearing to be removed, and a pulling arbor assembly extending through the support for gripping engagement with the bearing, the latter being pulled by retraction of the arbor in the support. The present invention is concerned primarily with the pulling arbor assembly, and in this regard, has for its general object to provide an improved expansible arbor characterized by its proven practicability and efficiency in its gripping engageability with the bearing, sustained durability under hard usage, convenience in use as an eminently practical tool, and adaptability for simple and accurate manufacture.

The present arbor assembly comprises generally a tubular externally threaded arbor body slotted longitudinally along its inner end extent to form a plurality of fingers spreadable radially into gripping engagement with the bearing by a mandrel or wedge pin displaceable axially within the body. The invention is concerned in certain major respects with the form and working relation of the mandrel or wedge pin and the arbor finger surfaces engaged thereby, and with the form and relation between the bearing engaging or gripping surfaces of the fingers and the oppositely positioned wedge surfaces at the inside.

One particular object of the invention is to provide for more precise and durable engagement between the finger and expansion pin wedge surfaces in relation to the external bearing engaging finger surfaces, to the end that the expansion forces shall be transmitted to the fingers at locations tending to minimize the setting up of bending stresses, and to transmit the expansion forces to the gripping dies or teeth in such radial relation as to assure most effective gripping action against the bearing. As will appear, the invention contemplates transmission of the wedge force by essentially single line contact between the expansion pin and fingers, by forming on each, interengaging curved wedge surfaces in approximately direct radial alinement with the gripping teeth. Thus the creation of bending stresses in the fingers is minimized in relation, for example, to the conditions existent where some of their parts are engaged along straight line or frusto-conical wedge surfaces.

Another important feature of the invention is the employment of a removable and replaceable wedge pin engageable between the finger wedge surfaces and a screw turned into the outer end of the arbor. By virtue of the removability of the pin, any wear of the wedge end of the pin to a degree such that the particularly advantageous conditions discussed in the foregoing may no longer exist, can be corrected simply by replacement of the pin alone.

A further feature of the invention is the adaptability of the arbor assembly to manufacture in various diameter sizes such that a set of the tools can be used for removal of bushings having a rather wide range of internal diameters extending down to small sizes which cannot be removed, at least with comparable effectiveness, by any other tool of which I am aware.

All the features and objects of the invention, as well as details of a typical and illustrative embodiment, will be further understood from the following detailed description of the accompanying drawing, in which:

Fig. 1 is a view showing the supporting table and pulling arbor assembly in perspective;

Fig. 2 is a view taken axially through the arbor, showing its pulling end positioned within a bearing;

Fig. 3 is a cross-section on line 3—3 of Fig. 2; and

Fig. 4 is a fragmentary view showing in axial succession, the pulling end of the arbor with its fingers in expanded positions.

Referring first to the perspective showing in Fig. 1, the entire tool assembly comprises a legged platen or table, generally indicated at 10, adapted to be positioned against the outside of the work, such for example as a cylinder or the like containing a bearing or bushing to be removed by the tool, and a pulling arbor assembly, generally indicated at 11, extending centrally through the table and adapted to be moved axially relative thereto, as will later appear. Since the invention is primarily concerned with the pulling arbor assembly 11, it will be understood that the supporting table assembly 10 may be of any form and construction suited to the support of the arbor in its manipulations and pulling movements.

Merely as illustrative, the table assembly 10, is shown to comprise an essentially equilateral triangle-shaped platen 12 carrying at its three corners the laterally or radially adjustable legs 13. Each leg is shown to comprise an intermediate cylindrical enlargement 14 integral with a lower concentric extension 15, also formed integrally with an upper extension or trunnion 16 received within an opening 17 in the platen, the extensions being axially offset in relation to the intermediate portion 14 so that the legs may be rotatably adjusted and positioned to vary the points of engagement of the bottom extensions 15 with the work. Thus, to illustrate, where the tool is to be used for removing a bushing or bearing from a cylinder or block, conventionally indicated at 18 in Fig. 2, the legs 13 are engaged against the end of the cylinder with the inner pulling end of the arbor assembly 11 inserted into the bushing 19. Where the cylinder end may carry irregularities, such as bolt heads or holes which might interfere with the uniform positioning of the legs 13 against the cylinder if the legs were in fixed relative positions, the table assembly 10 may be made to conform to the same planar surface or surfaces of the work by appropriate eccentric adjustment of the legs.

The arbor assembly 11 is shown to comprise a tubular body 20 insertible through opening 21 in the table 12, and externally threaded at 22 to receive the nut 23. As illustrated in Fig. 2, the arbor body 20 has an intermediate bore 24, the upper end of which opens into an internally threaded counter-bore 25 which receives the threaded mandrel advancing screw 26. Above the threads 22, the head of the arbor body has a pair of opposed wrench flats indicated in Fig. 1 at 27.

The lower extent of the arbor body is radially slotted at 28 to form typically three work-engaging or gripping fingers 29, the intermediate external diameter of which is substantially less than the body diameter above, as to the extent of the curve reduction at 30. The arbor metal at the lower gripping ends of the fingers enlarges at 31 beyond the curved flare 32 to present external gripping dies or teeth 33. It is further advantageous to form the teeth 33 by the intersection of an upper shoulder 34 extending downwardly and outwardly at relatively greater angularity (i. e. in relation to the axis of the tool) with a lower surface 35 extending downwardly and inwardly at lesser angularity relative to the axis of the tool. Intermediate the curvature 32 and the shoulder 34 may be a segmental cylindrical surface 36. The intersection of surfaces 34 and 35 presents a sharp gripping edge which upon expansion of the fingers, as will later appear, may penetrate the bearing 19 sufficiently to secure it to the arbor for removal, see Fig. 4. In other instances, where it may be desired not to bite into the bearing but instead to remove it by pulling engagement as with its inner end surface 37, the angularity of shoulder 34 is such that the shoulder may be expanded outwardly against the bearing end 37 and the bearing pulled without excessive swedging and spreading effect of the shoulder against the bearing.

The inner portions of the metal 31 at the finger terminals is shaped to present curved surfaces or shoulders 38 which preferably are positioned radially opposite the teeth 33, as for the particular purposes that will presently appear.

The arbor bore 24 contains a mandrel or expansion pin 40 movable axially within the arbor by rotation of the screw 26. Being subjected to excessive pressures and wear at its finger expanding end, and it being desirable to maintain essentially line contact between the mandrel and the curved finger shoulders 38 (which condition might be lost after excessive wear of the mandrel) it is advantageous that the mandrel be made as a separate and replaceable pin 40. Accordingly, the pin is shown to have an upper larger diameter extent 41 freely movable but guided closely within the bore 24 to accurately center the pin between the screw 26 and the wedge shoulders 38. The upper end of the pin has a frustro-conical surface 42 seating against and within a correspondingly shaped surface and recess 43 within the end of the screw 26. The lower portion 44 of the pin has a reduced diameter and terminates at a substantially hemispherical end surface 45 which has wedging engagement against the inner curved shoulder surfaces 38 of the fingers 29. It will be noted that the point of interengagement between the surfaces 38 and 45 is about directly opposite the teeth 33 so that the expanding wedge thrust imparted from the pin to the fingers is transmitted with such radial directness from the line-contact engagement between the pin and fingers to the teeth 33, as to create no serious bending stresses or strains in the fingers 29. Also, by virtue of the curved configurations of the inter-engaging wedge surfaces they remain in essentially line contact at little variation axially of the tool as the surfaces wear, and of especial importance, at essentially the same radial alinement with the teeth at all spread positions thereof.

In considering the operation of the tool, assume that it is to be used for the extraction of a bushing or bearing 19 from the block 18. The table assembly 10 is positioned with its legs engaged against the end of the block and in centered relation to the bearing so that the arbor may be inserted to the Fig. 2 position. By advancing screw 26, the fingers 29 are radially spread to the Fig. 4 position, causing teeth 33 to penetrate and securely grip the bearing. Then upon rotation of nut 23, the entire arbor assembly and bearing may be pulled out of the block or cylinder 18. By virtue of the separate formation of the expansion pin and screw, the former is permitted to accommodate itself without strain, to the working forces. Thus, whereas in the case of an integrally formed pin and screw, any binding at the wedge surfaces might impose such resistance as to cause bending or other deformation of the pin, here the independent conformability of the pin to the working stresses permits its maintenance in a straight centered condition.

I claim:

1. A tool for extracting bushings and the like, comprising an externally threaded tubular arbor adapted to be carried for axial adjustment within a supporting table, the inner end extent of said arbor having a length of reduced external diameter and an enlarged diameter terminal portion, said reduced extent and terminal portion being longitudinally slotted to form radially expansible fingers having outer segmental work gripping shoulders on the periphery of said enlarged terminal portion, segmental inner wedge shoulders formed on said fingers at the inside of said terminal portion and opposite said outer shoulders, a wedge pin provided with a convexly curved outer end contained in and movable axially relative to said arbor and acting to engage said inner shoulders and wedge the fingers outwardly upon axial movement of the pin, said wedge shoulders having convexly curved wedge surfaces forming cam faces of decreasing angularity with respect to the arbor axis and adapted to be engaged by said outer surface on the pin in essentially arcuate line contact with respect to the axis of said pin and in substantially radial alinement with said outer work gripping shoulders, whereby axial wedging movement of said pin against said inner shoulders acts in toggle relationship to wedge the fingers outwardly at a progressively decreasing rate and with progressively increasing force, and screw means threadedly engaging said arbor and the inner end of said pin for actuating said pin axially relative thereto.

2. A tool as recited in claim 1, in which said outer shoulders have sharp gripping edges formed by the intersection on each segment of one surface facing the outer end of the arbor and extending at relatively great angularity relative to the arbor axis and a second surface facing essentially toward the inner end of the arbor and extending at lesser angularity relative to said axis.

References Cited in the file of this patent

UNITED STATES PATENTS

| 154,345 | Saunders | Aug. 25, 1874 |
| 736,991 | Matthews | Aug. 25, 1903 |
| 1,367,016 | Campbell | Feb. 1, 1921 |
| 2,373,064 | Stelzer | Apr. 3, 1945 |
| 2,386,253 | Meyer | Oct. 9, 1945 |
| 2,623,276 | Anderson | Dec. 30, 1952 |

FOREIGN PATENTS

| 844,419 | France | July 25, 1939 |